United States Patent

[11] 3,582,541

[72] Inventor James W. Hebb
Mountain View, Calif.
[21] Appl. No. 676,502
[22] Filed Oct. 19, 1967
[45] Patented June 1, 1971
[73] Assignee Ampex Corporation
Redwood City, Calif.

[54] COINCIDENCE SERVOSYSTEM
18 Claims, 2 Drawing Figs.

[52] U.S. Cl. .......... 178/6.6, 318/314
[51] Int. Cl. .......... G11b 21/02, H02p 5/28
[50] Field of Search .......... 178/6.6 A; 318/314, 318

[56] References Cited
UNITED STATES PATENTS

| | | | |
|---|---|---|---|
| 3,050,594 | 8/1962 | Bick et al. | 179/100.2 |
| 3,086,157 | 4/1963 | Branco | 318/314 |
| 3,206,549 | 9/1965 | Bahring | 178/69.5 |
| 3,331,006 | 7/1967 | Strand et al. | 318/314 |
| 3,361,949 | 1/1968 | Brown et al. | 318/314 |

*Primary Examiner*—Bernard Konick
*Assistant Examiner*—Robert S. Tupper
*Attorney*—Robert G. Clay

ABSTRACT: A method and digital servosystem for enabling synchronization of two related systems. The digital servosystem includes a basic servo having a digital comparator receiving a first command signal and a feedback signal, a coincidence servo interrupting the feedback signal path and receiving input signals of a second command signal and a signal indicative of the condition of the basic servo, the coincidence servo providing an error digital signal responsive to the relationship of the input signals, said coincidence servo adding or subtracting pulses to the feedback signal to step position the basic servo to phase it with the second command signal, the coincidence servo being locked out when the basic servo is in phase.

INVENTOR.
JAMES W. HEBB
BY Thomas E. Schatzel
ATTORNEY

INVENTOR.
JAMES W. HEBB
BY Thomas E. Schatzel
ATTORNEY

COINCIDENCE SERVOSYSTEM

BACKGROUND OF THE INVENTION

The present invention relates to a method and servosystem for enabling synchronization of two related input command reference signals.

Though, as will be evident from the description the present invention has application in many technological arts, it has been found to provide highly beneficial applications in the magnetic tape recorder/reproducer art, e.g. synchronizing tape transports with each other or with another related reference. A specific application, which will be discussed in detail, is the synchronization of the rotary head drum servo of a video tape recorder with a video information transmitter transmitting intermittent bursts of video information to be recorded by the recorder. With the bursts having a synchronized repetitious rate and the tape traveling longitudinally at a predetermined rate past the rotary head, it is necessary to synchronize or "lock-up " the head with the transmitting rate of the bursts.

Prior methods and servos, known to the inventor, generally employed a voltage controlled oscillator system. The oscillator responds to an error pulse signal and provides an analog signal to the second servo. However, the frequency accuracy of the analog signal is a function of temperature variations. Also, low servo gain and lockup time impose other undesirable limitations.

SUMMARY OF THE INVENTION

Practicing the present system may include a digital system in which operation of a first servo, hereinafter referred to as the basic servo, is responsive to a first command signal received at a digital comparator. The basic digital servo may be a control system for the head drum of a rotary-head video tape recorder with the first input command being a square wave signal the frequency of which coincides with the desired drum rotational velocity. The basic servo includes a feedback means generating a digital signal which is also received at the digital comparator and indicative of the actual condition of the head drum. A second servo, hereinafter referred to as the coincidence servo loop, interrupts the feedback path of the basic servo and is adapted to modify the feedback train by adding or subtracting pulses.

Modification of the feedback train is dependent upon the relationship of input signals to the coincidence servo. The coincidence servo input signals may be in the form of a second input command signal, e.g. preline start pulse train, and a train of digital signals responsive to the operational condition of the head drum controlled by the basic servo, e.g. once-around tachometer pulses. The coincidence servo input signals are received by a coincidence comparator providing an error signal having a magnitude and polarity responsive to the relationship of its input signals. The error signal is in turn received by a pulse add or subtract logic network which provides responsive add or subtract pulses. The add or subtract pulses modify the feedback train to the digital comparator of the basic servo so as to "step position" the head drum until it is in phase with the first command signal. When the coincidence requirement is met and the head drum is "in phase", the coincidence servo loop is "locked out" permitting the head drum servo to operate normally and maintain synchronism with its normal input command signal frequency.

DESCRIPTION OF THE PREFERRED EMBODIMENT

Figure 1:
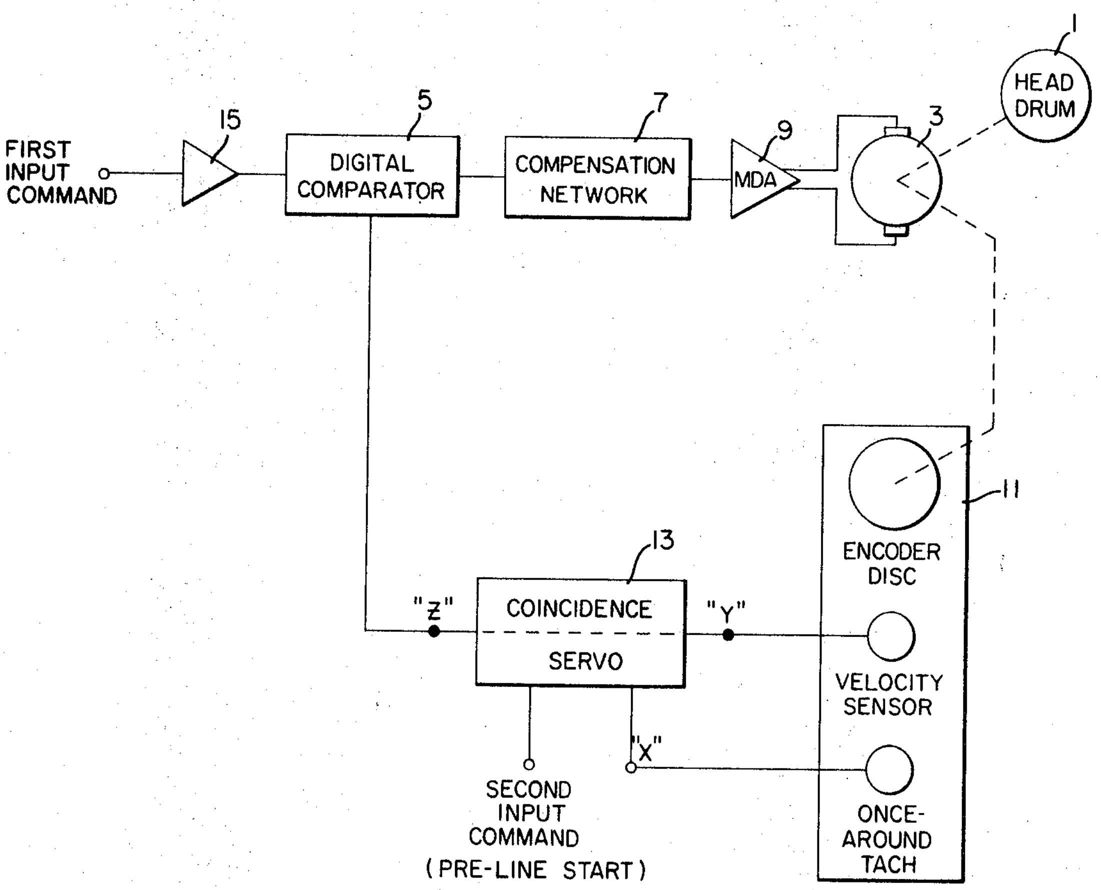
FIG. 1 is a block diagram of a control system and illustrating the relationship of a basic servo with a coincidence servo in accordance with the teachings of the present invention for controlling the rotational velocity of a head drum of a video tape recorder.

FIG. 1 diagrammatically illustrates a control system including the prime sections of a basic servocontrol network presently incorporated in a wideband rotary-head instrumentation magnetic tape recorder/reproducer in combination with a coincidence servocontrol network to "lockup" the head drum with synchronized intermittent bursts of information originating with a remote video transmitter. The system provides a closed loop control of the operation of a rotary head drum 1 driven by a direct current motor 3. Assuming that the intermittent bursts have relatively long inter record gaps, it is desirable to record these bursts in sequence with maximum density and minimum waste of tape. To accomplish this, the transducers mounted on the head drum 1 must be in proper position in relationship to the tape (not shown) when the bursts are received. Thus, the head drum 1 must be synchronized with the bursts so that during the nondata periods, the tape is adequately advanced to make virgin tape available when the next burst is received.

The illustrated basic servo includes a backward-forward digital counter or comparator 5 (used as a servo error detector), a compensation network 7, a motor drive amplifier (MDA) 9, and a tachometer assembly or position encoder 11 coupled to the motor 3 and illustrated in the form of an optical tachometer assembly having a velocity sensor and a once-around tachometer. Interrupting the feedback path and intermediate the encoder 11 and the digital comparator 5 is a coincidence servo 13 hereinafter discussed and illustrated in detail in FIG. 2. The basic servo receives a first input command signal at an amplifier 15 designed to shape the command signal to a square wave. The input command frequency dictates the desired rotational velocity of the motor 3 and head drum 1.

The digital comparator 5 serves as the error detector of the basic servo loop. As will be evident to those skilled in the art, various digital comparator configurations may be included. The primary function is the comparison of the first input command frequency with the feedback signal from the position encoder 11. A common version of a digital comparator 5 is such that when the first input command frequency exceeds the frequency of the feedback signal, the comparator output is a positive level causing the motor 3 to accelerate. The positive level continues until the input command and velocity signal frequencies are approximately equal. At the moment the frequencies are equal or approximately equal, the comparator 5 changes mode of operation and compares on a phase basis. It then functions as a phase comparator and the output is proportionally related to the phase difference between the input command and velocity signals. Its output is an asymmetrical square wave the asymmetry of which contains the servo error. Its repetition rate is equal to the input command frequency.

The error signal output of the comparator 5 passes through the linear compensation network 7 for system stabilization. The error signal, which is a voltage proportional to the phase error, is received by the motor drive amplifier 9. The amplifier 9, in turn, provides responsive current for controlling the armature excitation of the motor 3.

Up to this point the discussion has centered about the basic servosystem for controlling the rotary-head drum 1. Now assume that it is that it is desirable not only to servocontrol the head drum 1 but also lock it in synchronization with another source, e.g. the bursts of the instruments sending transmitter previously mentioned. Thus, the basic servo must be synchronized with the video bursts so that the head drum 1 is in a precise position relative to the magnetic tape being driven past the head when each burst is received. Assuming the head drum 1 rotates four times between each burst, the head must be in proper position every fourth revolution to record the transmitted data. To realize the necessary synchronization the coincidence servo 13 is inserted in the feedback path to the digital comparator 5 to interrupt the feedback path to the digital comparator 5 to interrupt the feedback train from the velocity sensor of the encoder 11. In practice the coincidence servo 13, illustrated in detail in FIG. 2, adds or subtracts pulses into the feedback path to the digital comparator 5 to step the motor 3 until a synchronism is realized at which point the servo 13 is "lockedout" and bypassed by the signals from the velocity sensor of the encoder 11, as indicated by the broken line path. When the coincidence servo 13 is "locked out," the rotary had drum 1 continues to maintain synchronism with the normal input frequency derived from the first input command signal received at the amplifier 15.

Figure 2:
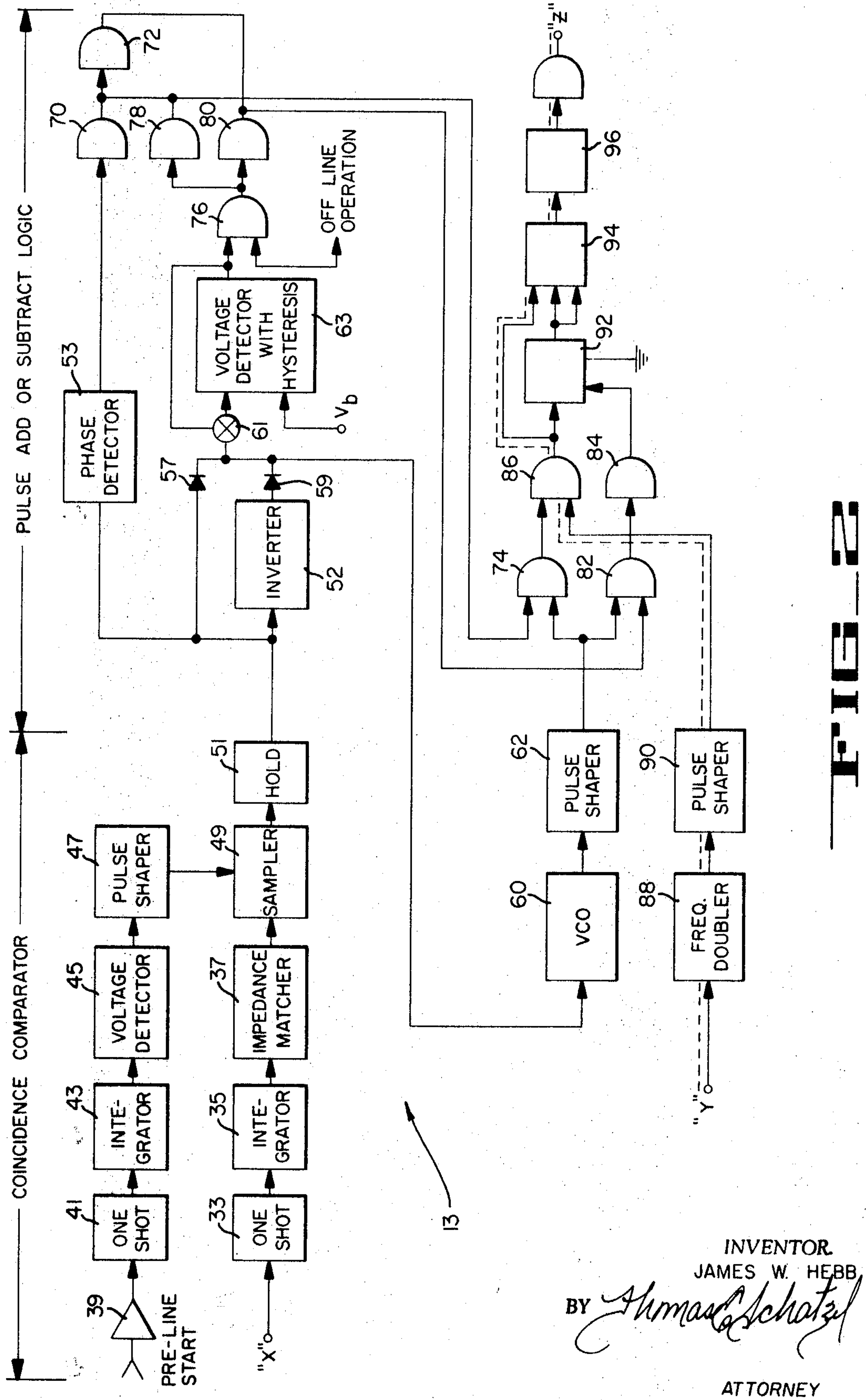
FIG. 2 is a block diagram of the coincidence servo of FIG. 1 in accordance with the present invention.

In FIG. 2, the coincidence servo 13 is shown in detail by a block diagram and illustrated as comprising two main sections designated Coincidence Comparator, and Pulse Add or Subtract Logic. The Coincidence Comparator receives two input pulse signals, One input is indicative of the actual position of the head drum 1 and is received at the designated point X. Referring back to FIG. 1, the signal at X may originate with the once-around tachometer of the encoder 11. The once-around tachometer provides a signal indicative of the position of the head drum 1. For a detailed discussion of such a tachometer see U.S. Pat. application Ser. No. 644,234, now U.S. Pat. No. 3,491,247, of James W. Jones. The once-per-revolution pulse is received by a once-per-revolution circuit network including a one-shot multivibrator 33. The multivibrator 33 sets off an integrator 35 such as a ramp generator integrating between a negative level to a coinciding positive level, e.g. −3 volts to +3 volts. The integrator 35 feeds into an impedance matcher 37, such as a voltage follower the output of which is a ramp for a few milliseconds and then holding at the DC level for approximately half a revolution of the had drum 1 and then returning to the negative level, e.g. −3 volts.

The other input to the coincidence servo 13, previously referred to as the second input command and representing the second source to be synchronized with the head assembly 1, may be in the form of a preline start associated with the video bursts generated by a remote video transmitter previously mentioned. Thus, in essence, the system is not locked on the bursts but on the preline pulses which are related to the bursts. Each preline pulse may immediately precede a burst. As previously mentioned, it is desirable to have the head drum 1 in the proper position for recording each time a burst is received. The preline start signal is amplified by an amplifier 39 and then received by a one-shot multivibrator 41. The multivibrator 41 output sets off an integrator 33 which integrates symmetrically between a negative level and coinciding positive level, e.g. −3 volts to +3 volts. The integrator 43 in turn is tied to a voltage detector 45 which detects when zero volts is reached and a pulse is then formed by a pulse shaper 47. The pulse from the shaper 47 is received by a sampler network 49 and used to sample the output of the impedance matcher 37 from the once-per-revolution circuits. The sampled voltage signal is held by a hold network 51. Accordingly, at the output of the hold network 51 appears an error signal indicative of positional error of the head drum 1 in relationship to the desired position for recording the transmitted video bursts.

The hold circuit 51 is tied to the Pulse Add or Subtract Logic section and received by an inverter 52, a phase detector 53, and a diode 57. The phase detector 53 may be in he form of a saturating amplifier to convert the Coincidence Comparator error output to an addition or subtraction command logic level. The amplifier may assume a saturated state for a signal of one polarity and a nonsaturated state for the other polarity. Thus, the detector output will be a binary one or zero. The inverter 52, diode 57 along with a diode 59 tied to the inverter 52, in effect form an OR logic circuit and are used to detect the error magnitude. The OR logic circuit provides a path for the error signal, whether positive or negative, and at the same time offers a high impedance looking back into the coincidence comparator circuitry. The error signal is received by a voltage controlled oscillator (VCO) 60 and a summer network 61. The error signal amplitude controls the frequency of the voltage controlled oscillator 60. As will hereinafter become more apparent the output of the VCO 60, which is shaped by a pulse shaper 62, modifies the pulse repetition output rate of the coincidence servo 13, and therefore, the rate of adding or subtracting pulses depending on the magnitude of the error signal. The summer 61 is common to the input of a magnitude threshold detector illustrated in the form of a voltage detector with hysteresis network 63 and a feedback loop extending from the output of the network 63. The network 63 detects the error magnitude and the hysteresis provides a synchronizing margin to guard against an unstable condition. The network 63 may be biased by a source $V_b$ to allow a small but fixed coincidence timing error between the once-per-revolution position of the head drum 1 and the preline start input signal. When the coincidence error is below this value, the coincidence servo loop 13 is in effect "locked out" of the feedback path of the basic servo and the basic servo operates as previously discussed in connection with FIG. 1.

Thus, to this point, the Pulse Add or Subtract Logic network may be summarized as follows: the output of the phase detector 53 indicates whether the error is pulse or minus necessitating add or subtract pulses; the output of the network 63 indicates whether the error is sufficient for the coincidence servo 13 is to be "in" or "out"; and the coincidence servo is to correct for the error.

The logic circuitry receiving the various pulses is illustrated in the form of various gates. Obviously, those skilled in the art will recognize that numerous logic circuit arrangements may be utilized to provide the add, subtract, or no output pulses necessary for controlling feedback signals in the digital phase comparator 5. However, to date the inventor has found the illustrated configuration to require the least number of logic circuits for accomplishing the necessary function. The output of phase detector 53 is received by an inverter gate 70. The output of the inverter gate 70 is common to an inverter gate 72 and the input of the NAND logic circuit 74. The output of the network 63 is received by a NAND circuit 76, the output of which is common to a pair of inverters 78 and 80. The output of the inverter 78 is common with the output of the inverter 70. The output of the inverter 80 is common with the output of the inverter 72 and the input of a NAND gate 82. It may be further noted that the NAND gate 76 has a second input terminal which is set as a normal TRUE condition but is adapted for off-line operation. For example, if it is desired to operate the basic servosystem with out locking up with the second input command source inactive while the off-line operation is taking place, such as when playing back a section of a prerecorded tape, a signal may be applied to the second input terminal of the NAND gate 76 making it nonconductive and isolating the coincidence comparator network from the system.

The output of the pulse shaper 62 is common to the input of the NAND gates 74 and 82. The output of the pulse shaper 62 biases the gates 74 and 82 in a "false" or "true" condition. The output of the NAND gate 82 is common with the input of an inverter 84. The output of the NAND gate 74 is common with the input of a NAND gate 86 and biases the gate 86 in alternative "false" and "true" conditions. The other input terminal of the NAND gate 86 is common to a frequency source at the point Y illustrated as the feedback from the velocity sensor of the encoder 11 (see FIG. 1). The velocity sensor generally provides a square wave signal of a frequency indicative of the rotational velocity of the motor 3. This is a high frequency signal in comparison to that of the VCO 60. For example, when the drum is rotating at 400 r.p.m. the frequency at Y is in the order of 25 kHz. At the same time the frequency of the VCO may be in the order of 20—100 Hz. The signal from the velocity sensor is doubled in a frequency doubler network 88 and then shaped by a pulse shaper 90. As indicated by the broken line, assuming that the logic signals from the NAND gates 82 and 74 are "false," the velocity sensing signal would be passed directly to the output at point Z. This illustrates the feedback path when the coincidence servo error is less than the established value determined by the network 63 and the coincidence servo "locked out." Assuming positive logic, the NAND gate 86 is such that when an addition condition is realized a pulse is passed from the pulse shaper 62 through the NAND gate 74 to the input of the gate 86 such that a pulse is added to the sensor feedback signal train from the shaper 90 attempting to pass to the output at the point Z. AT the same time, if the condition is to subtract pulses from the sensor feedback train, then the output of gate 70 is zero, rendering gate 74 inactive while the output of inverter 72 is a "true" signal activating gate 82 allowing the output of pulse shaper 62 to pass through gates 82 and inverter 84 into a J–K flip-flop 92. The operating mode of J–K flip-flops is well known in the art. Normally, the output of the gate 86 is fed to both the J–K flip-flops 92 and a J–K flip-flop 94. Unless pulse subtraction is in process, the J–K flip-flop 92 is inactive, and the pulse train frequency from gate 86 is fed to a J–K flip-flop 94 where it is divided in half by the action of J–K flip-flop 94. However, in the subtraction process, the action is to inhibit one pulse of the pulse train from the gate 86 for every pulse out of the gate 84. This is accomplished by the interconnecting circuitry and action of the J–K flip-flop 92 and 94 as follows. When a pulse is received by the J–K flip-flop 92 from the inverter 84, the J–K flip-flop 92 is set to zero. When the input of the J–K flip-flop 94 from the flip-flop 92 is zero, the input to the flip-flop 94 from the gate 86 is inhibited, However, the output of the gate 86 also goes to the flip-flop 92 in a manner to reset the output of the flip-flop 92 to a one state, allowing the next output of gate 86 to enter flip-flop 94 in the normal manner. In essence, the logic circuits 84 and 96 form a pulse inhibiter in which one pulse of the train from the drum encoder is inhibited for each VCO pulse allowed to enter. The serial connected flip-flop networks 92, 94 and 96 further aid in the inhibiting operation and dividing the frequency to a lower value coinciding with the original frequency generated by the drum encoder tachometer. The flip-flop 92 functionally serves as a set/reset memory. The frequency at the point Z is one-half that at Y with the exception of the add and subtract pulses which have been incorporated to correct for error. It may be noted that by performing the frequency divisional function after the addition or subtraction, the added or subtracted pulses are in effect divided by the amount of the division. Thus, for a division by two the corrective pulse appears to the digital comparator 5 of the basic servo as being a half of pulse. If, as in the illustration, the division is by a factor of four, the corrective pulse appears to be in the order of a quarter of a pulse. This tends to avoid instabilities which may otherwise occur with digital comparators.

It may be noted that it is possible to predict the synchronizing time of the system. There is essentially no overshoot and it is merely necessary to determine how long to step around to the zero error point which is dependent upon the frequency of the VCO 60.

From the foregoing description it may be noted that the described network is a digital system which provides exact and inherently reliable operation. Various features realized from the present structure include error direction discrimination, error magnitude determination, allowance for selection of hysteresis to set conditions when the coincidence servo becomes active, provision for selecting speed of convergence, and selection of magnitude of error in coincidence.

I claim:

1. A digital servocontrol system comprising:

a basic servocontrol network for controlling a first device to be synchronized with a second device and including having a digital comparator means receiving a first input command signal indicative of the desired operating condition of the first device and a feedback digital signal indicative of the actual condition of said first device, and feedback means providing within a feedback path to said comparator a feedback digital signal train indicative of the actual condition of said first device; and a coincidence servo interrupting said feedback path to said digital comparator, the coincidence servo receiving two input signals including a second input command signal indicative of the actual condition of said second device and a signal indicative of the actual condition of said first device, the coincidence servo generating an error signal adding or subtracting pulses to said feedback digital signal train depending upon the relationship of the input signals to the coincidence servo.

2. The servosystem of claim 1 including means for locking out the coincidence servo when the error signal generated within the coincidence servo is less than a predetermined value.

3. The servosystem of claim 2 in which the coincidence servo includes coincidence comparator means receiving the two input signals and generating a responsive digital error signal, pulse add or subtract logic circuitry receiving the digital error signal and including a first means for sensing the polarity of said digital error signal and providing commands the nature of which indicate whether pulses are to be added or subtracted to said feedback train, a second means for sensing the absolute magnitude of said error signal and providing commands to the means for locking out the coincidence servo when the error signal magnitude is less than a predetermined value, and a third means responsive to the error signal and providing commands indicative of the rate the add or subtract pulses are to be provided in said feedback digital train.

4. The servosystem of claim 3 in which the coincidence servo includes frequency multiplying means receiving said feedback digital signal train and multiplying the frequency a predetermined amount prior to adding or subtracting pulses responsive to the error signal of said coincidence comparator, and frequency dividing means receiving and dividing by the predetermined amount said multiplied frequency signal after the pulse addition or subtraction.

5. The servosystem of claim 4 in which said first means includes a saturable amplifier adapted to assume saturated or nonsaturated state dependent upon the polarity of the error signal.

6. The servosystem of claim 4 in which said third means includes a voltage-controlled oscillator, the frequency of which is related to the magnitude of said error signal.

7. The servosystem of claim 4 in which the second means includes a voltage detector with hysteresis network, the hysteresis level being biases to a predetermined level.

8. THe servosystem of claim 4 in which:

said first means includes a saturable amplifier adapted to assume a saturated or nonsaturated state dependent upon the polarity of the error signal;

said second means includes a voltage detector with hysteresis network, the hysteresis level being biases to a predetermined level; and said third means includes a voltage-controlled oscillator, the frequency of which is related to the magnitude of said error signal.

9. A method of synchronizing the head of a rotary-head magnetic tape recorder with intermittent bursts of information to be recorded, comprising:

servocontrolling the rotary-head of the rotary-head magnetic tape recorder with a servocontrol system including a backward-forward digital counter;

providing a first input command signal to the counter, said first signal indicative of the desired rotation of the head;

providing a feedback digital pulse train to the counter, said feedback train being indicative of the actual rotation of the head; and modifying the feedback digital pulse train by adding or subtracting pulses depending upon the phase relationship between the head and the bursts to be recorded.

10. The method of claim 9 further including:

generating a once-around signal train related to the actual rotational position of the head;

comparing the relationship of the once-around signal train of the head with a train of prestart signals related to the bursts to be recorded and generating an error signal the magnitude and polarity of which is indicative of the actual head position in relationship to the desired position for recording the bursts; and modifying the feedback digital pulse train in response to the error signal with the polarity of the error signal indicating whether pulses are to be added or subtracted and the magnitude of the error signal indicating the rate at which pulses are added or subtracted.

11. The method of claim 10 further including sensing the magnitude of the error signal and modifying the feedback pulse train only when the absolute value of the error signal exceeds a predetermined value, the predetermined value being selected to provide a synchronizing margin to guard against unstable operation.

12. The method of claim 11 further including multiplying the frequency of the feedback digital pulse train prior to modification, and then decreasing the frequency of the feedback train after modification.

13. A digital servocontrol system for synchronizing a rotary-head magnetic tape transport with a transmitter transmitting intermittent bursts of data comprising, in combination:

a basic servocontrol network for controlling the rotational operation of the rotary drum of a rotary-head magnetic tape transport and including a digital comparator means receiving a first input command signal indicative of the desired rotational velocity of said drum and a feedback digital signal train indicative of the actual velocity of said drum, feedback means for generating within a feedback path to said comparator a feedback digital signal train indicative of the actual velocity of said drum; and a coincidence servo interrupting said feedback path, the coincidence servo receiving two input signal including a second input command in the form of intermittent prestart pulses related to bursts of data to be recorded and a signal indicative of the actual position of said drum, the coincidence servo generating an error signal indicative of the phase relationship of the second command and actual position of said drum, and control logic means receiving said error signal and including a controlled oscillator means to provide pulse signals for modifying the feedback digital train, the oscillator frequency being responsive to the magnitude of the error signal, gating means receiving the pulse signals of said oscillator means and responsive to the polarity of the error signal, said gating means controlling whether pulses are added or subtracted to step function the head drum to the desired position when bursts are received.

14. The system of claim 13 further including:

a voltage detector means within the control logic means for sensing the magnitude of said error signal and locking out the coincidence comparator from the feedback path for error signals of a magnitude less than a predetermined value.

15. The system of claim 14 in which the voltage detector means includes a hysteresis network for providing a synchronizing margin.

16. A digital servosystem for controlling the operating condition of a rotating device, comprising: a first servo network having a digital comparator controlling such device in response to a first input command signal representing desired rate and phase operating conditions of such device and a feedback pulse signal representing actual rate and phase operating conditions of such device and a feedback pulse signal representing actual rate and phase operating conditions of such device; a feedback path coupled between said device and said comparator and carrying said feedback pulse signal; and a second servo network interposed in said feedback path responsive to a second input command signal to add or subtract pulses from said feedback pulse signal to a step position the phase condition of said device into synchronism with the second input command signal.

17. A method of controlling the phase position of a rotating member controlled by a digital servosystem in which the rate of rotation and phase of such member is determined by the output of a phase comparator receiving an input command pulse signal representing the desired rotational rate and phase condition and a feedback pulse signal representing the actual rate and phase condition of the member, characterized by the step of: adding or subtracting pulses from the feedback signal in accordance with a control signal to step change the phase condition of the rotating member.

18. The method as defined in claim 17, wherein said control signal is periodic and the phase condition of the rotating member is to be synchronized thereto, and being further characterized by the steps of: comparing the phase difference between the periodic control signal and the phase condition of the rotating member and adding pulses to or subtracting pulses from the feedback signal in accordance with the magnitude and polarity of such compared phase difference.